United States Patent [19]
Davis et al.

[11] Patent Number: 5,025,074
[45] Date of Patent: Jun. 18, 1991

[54] FLAME RETARDANT ORGANOPOLYSILOXANE-POLYCARBONATE TRIBLOCK COPOLYMERS

[75] Inventors: Gary C. Davis; Barbara E. McGrath, both of Albany; Kevin M. Snow, Clifton Park, all of N.Y.

[73] Assignee: General Electric Company, Schenectady, N.Y.

[21] Appl. No.: 572,283

[22] Filed: Aug. 27, 1990

[51] Int. Cl.$^5$ ............................................. C08G 77/06
[52] U.S. Cl. ...................................... 528/15; 528/26; 528/27; 528/29; 528/31; 528/32; 528/34; 556/462; 556/453; 556/456; 556/461
[58] Field of Search ....................... 528/15, 26, 27, 29, 528/31, 32, 34; 556/462, 453, 456, 461

[56] References Cited
U.S. PATENT DOCUMENTS 4,695,597  9/1987  Seino ..................................... 528/31
4,895,919  1/1990  Faler et al. ............................ 528/26

Primary Examiner—Melvyn I. Marquis
Assistant Examiner—Margaret Glass
Attorney, Agent, or Firm—William A. Teoli; James C. Davis, Jr.; William H. Pittman

[57] ABSTRACT

Phenol-organopolysiloxane chainstoppers are phosgenated in combination with a bisphenol to make flame retardant organopolysiloxane-polycarbonate triblock copolymers. The phenol-organopolysiloxane chainstoppers can be made by effecting addition between an aliphatically unsaturated phenol and a silicon-hydride organopolysiloxane.

11 Claims, No Drawings

FLAME RETARDANT ORGANOPOLYSILOXANE-POLYCARBONATE TRIBLOCK COPOLYMERS

CROSS REFERENCE TO RELATED APPLICATIONS

Reference is made to copending U.S. application Ser. No. 07/572,298, filed Aug. 27, 1990 filed concurrently herewith and Ser. No. 07/455,122, filed Dec. 12, 1989.

BACKGROUND OF THE INVENTION

The present invention relates to flame retardant organopolysiloxane-polycarbonate triblock copolymers which can be made by phosgenating a mixture of a phenol-organopolysiloxane chainstopper and a bisphenol. More particularly, the present invention relates to the use of phenol-organopolysiloxane chainstoppers which can be made by effecting a platinum catalyzed addition reaction between an aliphatically unsaturated phenol and a polyorganosiloxane terminated with a condensed diorganohydrogensiloxy unit.

Prior to the present invention, as shown by copending application Ser. No. 07/455,122, phenol-siloxane macromers were synthesized and used to make flame retardant silicone-polyphenylene ether graft copolymers. There also is shown in U.S. Pat. No. 4,916,194, flame retardant aromatic polycarbonate compositions based on the use of certain poly(arylsilicon) materials in combination with aromatic polycarbonate. Flame retardant thermoplastics and methods for making such materials are constantly being evaluated by the construction and automotive industries to satisfy their requirements for flame retardant injection moldable materials.

SUMMARY OF THE INVENTION

The present invention is based on the discovery that the phosgenation of a mixture of a phenol-organopolysiloxane chainstopper having the formula,

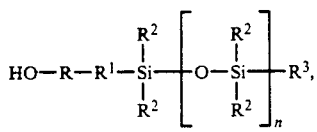

and a bisphenol having the formula, $$HO\text{-}R^4\text{-}OH, \quad (2)$$

can provide a flame retardant organopolysiloxane-polycarbonate triblock copolymer, where R is a $C_{(6-20)}$ polyvalent aromatic organic radical, $R^1$ is a $C_{(2-8)}$ aliphatic organic radical, $R^2$ is a $C_{(1-13)}$ monovalent hydrocarbon radical or a $C_{(1-13)}$ monovalent hydrocarbon radical substituted with radicals inert during equilibrium or condensation, $R^3$ is a $C_{(1-13)}$ monovalent organic radical, $R^4$ is a $C_{(6-30)}$ divalent aromatic organic radical and n is an integer equal to 0 to 100 inclusive.

The phenol organopolysiloxane chainstopper of formula (1) can be made by effecting a platinum catalyzed addition reaction between an aliphatically unsaturated phenol of the formula,

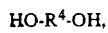

and a hydride polydiorganosiloxane of the formula,

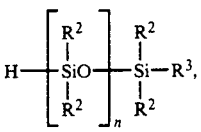

where R, $R^1$, $R^2$, $R^3$ and n are as previously defined, and $R^5$ is a $C_{(2-8)}$ aliphatically unsaturated organic radical.

As used hereinafter, the term "flame retardance" or "nonflammable" with respect to the flame retardant polycarbonate compositions of the present invention means that the flame retardant polycarbonates have satisfied the V-0 UL94 flammability requirements shown in the "Flammability of Plastic Materials Bulletin" of Jan. 24, 1980. More particularly, a 5"×½"×⅛" polycarbonate test bar is suspended vertically over a ¾" Bunsen Burner flame as provided in the aforementioned UL94 test. The test sample preferably exhibits a UL94 V-0 rating which includes the following criteria:

A. not have any specimens which burn with flaming combustion for more than 10 seconds after application of the test flame.

B. not have a total flaming combustion time exceeding 50 seconds for 10 flame applications for each set of five specimens.

C. not have any specimens which burn with flaming or glowing combustion up to the holding clamp.

D. not have any specimens which drip flaming particles that ignite dry absorbent surgical cotton located 12 inches (305 mm) below the test specimen.

E. not have any specimens with glowing combustion which persists for more than 30 seconds after the second removal of the test flame.

STATEMENT OF THE INVENTION

There is provided by the present invention, flame retardant organopolysiloxane-polycarbonate triblock copolymers comprising aromatic polycarbonate having terminal groups of the formula,

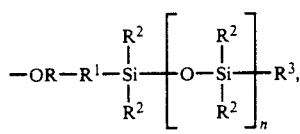

where R, $R^1$, $R^2$, $R^3$ and n are as previously defined.

Radicals included within $R^2$ of formulas 1, 3 and 5 are $C_{(1-8)}$ alkyl radicals, such as methyl, ethyl, propyl, butyl, pentyl; $C_{(6-13)}$ aromatic radicals such as phenyl, xylyl, tolyl, naphthyl; halogenated derivatives thereof, such as trifluoropropyl, chlorophenyl. Some of the radicals included within R of formulas (1), (3) and (5) are, for example, phenylene, naphthylene, and $C_{(1-8)}$ alkoxy-substituted derivatives thereof such as

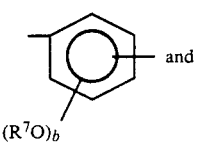

and $HO\text{-}R\text{-}R^5, \quad (3)$

-continued

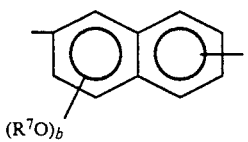

where $R^7$ is $C_{(1-8)}$ alkyl, and b is a whole number equal to 0 or 1.

Radicals included within $R^1$ are, for example, dimethylene and trimethylene. Radicals included within $R^3$ are, for example, methyl, butyl and phenyl. $R^4$ is preferably phenylene and

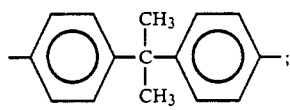

$R^5$ is preferably vinyl and allyl.

Included within the bisphenols of formula (2) which can be utilized in the practice of the present invention in combination with the phenol-organopolysiloxane chainstoppers of formula (1) to make the flame retardant organopolysiloxane-polycarbonate triblock copolymers are compounds such as:
resorcinol;
4-bromoresorcinol;
hydroquinone;
4,4'-dihydroxybiphenyl;
bis(4-hydroxy-3,5-dimethyl)biphenyl;
1,6-dihydroxynaphthalene;
2,6-dihydroxynaphthalene;
bis(4-hydroxyphenyl)methane;
bis(4-hydroxyphenyl)diphenylmethane;
bis(4-hydroxyphenyl)-1-naphthylmethane;
1,1-bis(4-hydroxyphenyl)ethane;
1,2-bis(4-hydroxyphenyl)ethane;
1,1-bis(4-hydroxyphenyl)-1-phenylethane;
2,2-bis(4-hydroxyphenyl)propane ("bisphenol A");
2-(4-hydroxyphenyl)-2-)3-hydroxyphenyl)propane;
2,2-bis(hydroxyphenyl)butane;
1,2-bis(4-hydroxyphenyl)isobutane;
1,1-bis(4-hydroxyphenyl)cyclohexane;
1,1-bis(4-hydroxyphenyl)cyclododecane;
trans-2,3-bis(4-hydroxyphenyl)-2-butene;
2,2-bis(4-hydroxyphenyl)adamantane;
α,α'-bis(4-hydroxyphenyl)toluene;
bis(4-hydroxyphenyl)acetonitrile;
2,2-bis(3-methyl-4-hydroxyphenyl)propane;
2,2-bis(3-ethyl-4-hydroxyphenyl)propane;

2,2-bis(3-n-propyl-4-hydroxyphenyl)propane;
2,2-bis(isopropyl-4-hydroxyphenyl)propane;
2,2-bis(3-sec-butyl-4-hydroxyphenyl)propane;
2,2-bis(3-t-butyl-4-hydroxyphenyl)propane;
2,2-bis(cyclohexyl-4-hydroxyphenyl)propane;
2,2-bis(3-allyl-4-hydroxyphenyl)propane;
2,2-bis(3-methoxy-4-hydroxyphenyl)propane;
2,2-bis(3,5-dimethyl-4-hydroxyphenyl)propane
2,2-bis(2,3,5,6-tetramethyl-4-hydroxyphenyl)-propane;
2,2-bis(3,5-dichloro-4-hydroxyphenyl)propane;
2,2-bis(3,5-dibromo-4-hydroxyphenyl)propane;
2,2-bis(2,6-dibromo-3,5-dimethyl-4-hydroxyphenyl)-propane;
α,α-bis(4-hydroxyphenyl)toluene;

α,α,='α,α'-tetramethyl-α,α'-bis(4-hydroxyphenyl)-p-xylene
2,2-bis(4-hydroxyphenyl)hexafluoropropane;
1,1-dichloro-2,2-bis(4-hydroxyphenyl)ethylene;
1,1-dibromo-2,2-bis(4-hydroxyphenyl)ethylene;
1,1-dichloro-2,2-bis(5-phenoxy-4-hydroxyphenyl)-ethylene
4,4'-dihydroxybenzophenone;
3,3-bis(4-hydroxyphenyl)-2-butanone;
1,6-bis(4-hydroxyphenyl)-1,6-hexanedione;
bis(4-hydroxyphenyl)ether;
bis(4-hydroxyphenyl)sulfide;
bis(4-hydroxyphenyl)sulfone;
bis(4-hydroxyphenyl)sulfoxide;
bis(4-hydroxyphenyl)sulfone;
bis(3,5-dimethyl-4-hydroxyphenyl)sulfone;
9,9-bis(4-hydroxyphenyl)fluorene
2,7-dihydroxypyrene;
6,6'-dihydroxy-3,3,3',3'-tetramethylspiro(bis)-indane ("spirobiindane bisphenol")
3,3-bis(4-hydroxyphenyl)phthalide;
2,6-dihydroxydibenzo-p-dioxin;
2,6-dihydroxythianthrene;
2,7-dihydroxyphenoxanthin;
2,7-dihydroxy-3,10-dimethylphenazine;
3,6-dihydroxydibenzofuran;
3,6-dihydroxydibenzothiophene;
2,7-dihydroxycarbazole;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenyl-2,2-propane;
4,4'-dihydroxy-3,3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl ether.

The hydride polydiorganosiloxane of formula (4) can be made in accordance with the method shown by C. L. Frye et al., Reactions of Organo Lithium Reagents with Siloxane Substrates, JOC, 35, 1308–1314 (1970) which is incorporated herein by reference. A typical procedure involves the reaction of 3 equivalents of butyllithium with hexamethylcyclotrisiloxane to produce a polydimethylsiloxane end-stopped at one end with dimethylbutylsiloxy units and at the other end with a dimethyllithiumsiloxy unit. This lithiated intermediate can thereafter be reacted under appropriate conditions with a silicon hydride, such as dimethylchlorosilane, to effect the addition of the silicon hydride functional unit. Although the employment of hexamethylcyclotrisiloxane is a preferred reactant, other cyclic diorganosiloxanes can be used, such as
trimethyltriethylcyclotrisiloxane;
trimethyltriphenylcyclotrisiloxane
hexaphenylcyclotrisiloxane;
trimethylcyclotrisiloxane;
1,3,5-tris[(cyanoethyl)methyl]cyclotrisiloxane;

1,3,5-tris[(3,3,3-trifluoropropyl)methyl]cyclotrisiloxane;

1,3,5-tris[(2-(2,3-cyclohexaneoxide))methyl]cyclotrisiloxane

Aliphatically unsaturated phenols which are included with formula (3) are for example,
4-hydroxystyrene;
2-methoxy-4-allylphenol;
4-allylphenol;
2-allylphenol;
2-methyl-6-allylphenol.

Platinum catalysts which can be used in the practice of the present invention to effect reaction between the hydride polydiorganosiloxane of formula (4) and the aliphatically unsaturated phenol of formula (3) are, for example, the reaction products of an olefin and chloroplatinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes and mixtures thereof, as shown in Lamoreaux, U.S. Pat. No. 3,220,972. In addition, platinum dispersed on carbon can be used. The preferred platinum catalyst is shown by Karstedt, U.S. Pat. No. 3,775,452, which is formed by reacting chloroplatinic acid with tetramethyldivinyldisiloxane in the presence of sodium bicarbonate in an ethanol solution. It has been found that effective results can be achieved if sufficient platinum catalyst is employed to provide from 1 to 250 parts per million of platinum, preferably from 1 to 200 parts of platinum per million parts of mixture.

Phosgenation of the mixture of the phenol-organopolysiloxane chainstopper of formula (1) and the bisphenol of formula (2) can be effected under interfacial reaction conditions utilizing water, an inert organic solvent and appropriate base. Temperatures in the range of from 0° C. to 45° C. can be employed. Suitable inert organic solvents which can be used are, for example, dichloromethane and chloroform.

Bases which can be employed are, for example, triethylamine, pyridine and sodium hydroxide.

In order that those skilled in the art will be better able to practice the present invention, the following examples are given by way of illustration and not by way of limitation. All parts are by weight.

EXAMPLE 1

There was cannulated 261.7 grams (1.18 mole) of hexamethylcyclotrisiloxane in 150 ml of tetrahydrofuran into a cooled solution of 3.9 grams (0.32 mole) of lithium trimethylsilylate in 300 ml of freshly distilled tetrahydrofuran which had been stirring for 1 hour at room temperature before being cooled to 0° C. under nitrogen. The resulting mixture was left to stir at 0° C. for 4 hours. There was then added 35 ml (0.32 mole) of dimethylchlorosilane followed by 300 ml of cyclohexane. The resulting white slurry was stirred for an additional 12 hours. The volatile components were stripped by roto-evaporation and the white slurry was treated twice with 250 ml of cyclohexane followed by roto-evaporation. A sintered-glass funnel was used to filter the precipitate. After the filtrate had been stripped of volatiles by rotoevaporation, there was obtained 281 grams (91% yield) of a light-yellow liquid. Based on method of preparation, the product was an $\alpha m$-hydro-$\Omega$-methylpolydimethylsiloxane having an average of about 12 dimethylsiloxy units.

There was added 260 grams over a 10 minute period of the above $\alpha$-hydro-$\Omega$-methylpolydimethylsiloxane to a stirring mixture of 40.5 grams of 4-acetoxystyrene, 2.5 grams of platinum on carbon and 2 liters of methylene chloride. The mixture was stirred at reflux for 15 hours. The mixture was then allowed to cool to room temperature and filtered. The methylene chloride and unreacted volatiles were stripped by roto-evaporation in vacuum (0.2 torr, 150° C.).

The resulting phenol adduct was then deprotected by dissolving 10.1 grams of the residue obtained above in 50 ml of methanol. There was then added to the mixture 0.14 ml of water followed by 1.06 grams of potassium carbonate. The mixture was stirred for 15 hours at room temperature. After effecting removal of potassium acetate and excess potassium carbonate, the methanol was stripped by roto-evaporation and a viscous product was obtained which was dissolved in diethylether and washed with 1 normal HCL followed with water. The ether layer was dried over anhydrous magnesium sulfate. The ether was removed by roto-evaporation, leaving 8.9 grams of product. Based on method of preparation, the product was a phenol chainstopper within the scope of formula (1).

Additional phenol chainstoppers were made utilizing other aliphatically unsaturated phenols such as 2-methoxy-4-allylphenol, and 2-allylphenol following the same procedure.

EXAMPLE 2

Solutions of the chainstoppers of Example 1, such as chainstopper resulting from the hydrosilylation of 2-methoxy-4-allylphenol (1), 2-allylphenol (2), or 4-acetoxystyrene (3) in 20 ml of methylene chloride, were respectively added dropwise to mixtures of bisphenol A, triethylamine, 100 ml deionized water, and 110 ml of methylene chloride. While stirring rapidly, gaseous phosgene (20% excess) was added to each of the mixtures at a rate of 0.5 grams/minute maintaining the pH at 9–10 by addition of 50% aqueous NaOH. The pH's were increased to 10–10.5 and maintained during the last 20% of phosgene addition. The methylene chloride layers were washed with dilute HCl, washed with water, and precipitated into methanol. The resulting polymers were collected, washed with methanol and dried. The molecular weights of the polymer were measured by GPC using polystyrene standards. Controls using 2-allylphenol (4), p-cumylphenol (5), or phenol (6) as a chainstoppers were also made. The summary of chainstopper levels ("mole percent CS") and mole percent incorporation of chainstopper measured by IH-NMR also is shown by the following tables, where 1, 2 and 3 under chainstoppers in Table I corresponds to chainstoppers derived from 2-methyl-4-allylphenol, 2-allylphenol or 4-acetoxystyrene, TEA means triethylamine and DMAP means dimethylaminopyridene:

TABLE I

| Chain-Stopper | Mol % [CS] | Mol % TEA | $<Mn>$ | $<Mw>$ | D | Mol % Incorp. |
|---|---|---|---|---|---|---|
| 1 | 1.8 | 1 | 21K | 168K | 8 | 1.1 |
| a | 1.8 | 1 | 92K | 166K | 1.8 | 0.8 |
|   | 1.8 | 1 | 94K | 179K | 1.9 | 0.8 |
|   | 3.5 | 1 | 30K | 93K | 3.1 | 1.5 |
|   | 3.5 | 10 | 27K | 108K | 4 | 1.7 |
|   | 3.5 | 2 | 27K | 92K | 3.4 | 2 |
| 2 | 1.8 | 1 | 24K | 148K | 6.2 | 0.9 |

TABLE I-continued

| Chain-Stopper | Mol % [CS] | Mol % TEA | <Mn> | <Mw> | D | Mol % Incorp. |
|---|---|---|---|---|---|---|
| b | 3.5 | 1 | 18K | 49K | 2.7 | 2.3 |
| c | 3.5 | 1 | 23K | 60K | 2.6 | 1.9 |
| d | 3.5 | 1 | 15K | 72K | 4.8 | 1.1 |
|   | 3.5 | 1 | 21K | 90K | 4.3 | 2.8 |
| 3 | 3.4 | 10 | 21K | 55K | 2.6 | 2.6 |
|   | 3.5 | 1 | 22K | 55K | 2.5 | 2.5 |
|   | 3.5 | 10 | 19K | 48K | 2.5 | 2.8 |
| 4 | 2.0 | 1 | 28K | 98K | 3.5 | — |
| 5 | 1.8 | 1 | 24K | 86K | 3.6 | — | a Repeat of Example 1 but at pH 10-11,
b Plus 1.5 mol % p-cumylphenol,
c Plus 1.0 mole % p-cumylphenol,
d DMAP was exchanged for TEA.

UL-94 samples were prepared by compression molding 1/16" plaques from dried powder at 200°-210° C. under 5000 psi for 2-2.5 minutes, which were converted to 0.5"×5" flame bars. The summary of UL-94 results are shown as follows, where FD is flame drip and FOT is flame out time, and "6" under "chainstopper" covers phenol chainstopped commercial polycarbonates:

TABLE II

| Chain-Stopper | <Mw> | Ave FOT 1st burn | Ave FOT 2nd burn | UL-94 rating (1/16") |
|---|---|---|---|---|
| 1 | 168,000 | — | — | — |
|   | 166,000 | 4.0 | 2.9 | V-0 |
|   | 179,000 | 1.7 | 1.9 | V-0 |
|   | 93,000 | 7.3 | 4.2 | V-1 |
|   | 108,000 | 2.9 | 4.5 | V-0 |
|   | 92,000 | 2.6 | 7.1 | V-0 |
| 2 | 148,000 | 2.1 | 2.4 | V-0 |
|   | 49,000 | 3.1 | FD | — |
|   | 60,000 | 2.8 | 4.2 | V-0 |
|   | 72,000 | 3.3 | FD | — |
|   | 90,000 | 1.8 | 4.4 | V-1 |
| 3 | 55,000 | 3.7 | FD | — |
|   | 55,000 | 4.8 | 4.7 | V-0 |
|   | 48,000 | 5.7 | FD | — |
| 4 | 98,000 | FD | — | — |
| 5 | 86,000 | FD | — | — |
| 6a | 64,000 | FD | — | — |
| b | 49,000 | FD | — | — |
| c | 63,000 | FD | — | — |
| d | 204,000 | FD | — | — |

FD = Flaming drip; Lexan resin 130, 140, 150, and Hylex resin (a-d) are all TM's of General Electric Company covering commercial polycarbonates.

The above results show that relatively short siloxane grafts provide enough drip resistance to prevent first-burn drips and in most cases enable polycarbonate to pass the UL-94 test with a V-0 rating.

Although the above example is directed to only a few of the very many variables which can be used in the practice of the method of the present invention as well as the flame retardant organopolysiloxane-polycarbonate triblock copolymers obtained therefrom, it should be understood that the present invention is directed to a much broader variety of organopolysiloxane-polycarbonate block copolymers which can be made by phosgenating a mixture of a bisphenol of formula (2) and a phenol-organopolysiloxane chainstopper of formula (1).

What is claimed is:

1. A flame retardant organopolysiloxanepolycarbonate triblock copolymer comprising an aromatic polycarbonate having terminal groups of the formula,

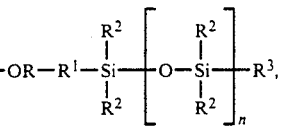

where R is a $C_{(6-20)}$ divalent aromatic organic radical, $R^1$ is a $C_{(2-8)}$ aliphatic organic radical, $R^2$ is a $C_{(1-13)}$ monovalent hydrocarbon radical or a $C_{(1-13)}$ monovalent hydrocarbon radical substituted with radicals inert during equilibrium or condensation, $R^3$ is a $C_{(1-13)}$ monovalent organic radical and n is an integer equal to 0 to 100 inclusive.

2. A flame retardant organopolysiloxane-polycarbonate triblock copolymer ion accordance with claim 1, where $R^2$ is methyl.

3. A flame retardant organopolysiloxane-polycarbonate triblock copolymer in accordance with claim 1, where R is

4. A flame retardant organopolysiloxane-polycarbonate triblock copolymer in accordance with claim 1, where $R^1$ is trimethylene and $R^3$ is methyl.

5. A method for making a flame retardant organopolysiloxane-polycarbonate triblock copolymer which comprises phosgenating under interfacial reaction conditions using water, an organic solvent and base and a mixture of a phenolorganopolysiloxane chainstopper having the formula,

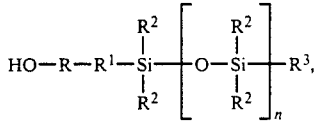

and a bisphenol having the formula,

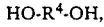

where R is a $C_{(6-20)}$ divalent aromatic organic radical, $R^1$ is a $C_{(2-8)}$ aliphatic organic radical, $R^2$ is a $C_{(1-13)}$ monovalent hydrocarbon radical or a $C_{(1-13)}$ monovalent hydrocarbon radical substituted with radicals inert during equilibrium or condensation, $R^3$ is a $C_{(1-13)}$ monovalent organic radical, $R^4$ is a $C_{(6-30)}$ divalent aromatic organic radical and n is an integer equal to 0 to 100 inclusive.

6. A method in accordance with claim 5 where the bisphenol is bisphenol A.

7. A method in accordance with claim 5, where the phenol-organopolysiloxane chainstopper is a methylpolysiloxane chainstopper.

8. A phenol-organopolysiloxane chainstopper having the formula

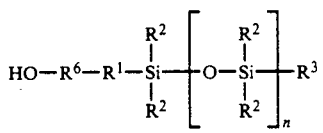

where $R^1$ is a $C_{(2-8)}$ aliphatic organic radical, $R^2$ is a $C_{(1-13)}$ monovalent hydrocarbon radical or a $C_{(1-13)}$ monovalent hydrocarbon radical substituted with radicals inert during equilibrium or condensation, $R^3$ is a $C_{(1-13)}$ monovalent organic radical, $R^6$ is a polyvalent aromatic radical selected from

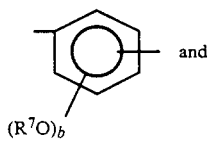 and

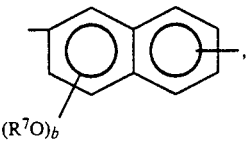, $R^7$ is a $C_{(1-8)}$ alkyl radical, n is an integer equal to 0 to 100 inclusive and b is a whole number equal to 0 or 1.

9. A phenol-organopolysiloxane chainstopper which is made by effecting a platinum catalyzed addition between 2-methoxy-4-allylphenol and a hydride polydiorganosiloxane.

10. A phenol-organopolysiloxane chainstopper which is made by effecting a platinum catalyzed addition between 2-allylphenol and a hydride polydiorganosiloxane.

11. A phenol-organopolysiloxane chainstopper which is made by effecting a platinum catalyzed addition between 4-acetoxystyrene and a hydride polydiorganosiloxane followed by the hydrolysis of the resulting adduct utilizing an alcohol solvent, water and an alkali carbonate.

* * * * *